United States Patent
Kimmel et al.

(10) Patent No.: US 7,472,298 B1
(45) Date of Patent: Dec. 30, 2008

(54) STORAGE SYSTEM AND METHOD FOR SAVING ENERGY BASED ON STORAGE CLASSES WITH CORRESPONDING POWER SAVING POLICIES

(75) Inventors: Peter Kimmel, Kaiserslautern (DE); Thomas Gardelegen, Wiesbaden (DE); Nils Haustein, Soergenloch (DE); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/024,015

(22) Filed: Jan. 31, 2008

(51) Int. Cl.
*G06F 1/32* (2006.01)
(52) U.S. Cl. ...................... 713/320; 713/324
(58) Field of Classification Search .......... 713/320, 713/324
See application file for complete search history.

(56) References Cited

U.S. PATENT DOCUMENTS

| | | | |
|---|---|---|---|
| 5,925,134 A * | 7/1999 | Solomon | 713/324 |
| 6,901,523 B2 | 5/2005 | Verdun | |
| 6,986,075 B2 * | 1/2006 | Ackaret et al. | 714/4 |
| 7,032,119 B2 * | 4/2006 | Fung | 713/320 |
| 7,073,052 B2 | 7/2006 | Brown et al. | |
| 7,080,201 B2 * | 7/2006 | Suzuki et al. | 711/114 |
| 7,134,011 B2 * | 11/2006 | Fung | 713/100 |
| 7,293,133 B1 * | 11/2007 | Colgrove et al. | 711/111 |
| 7,383,382 B2 * | 6/2008 | Powell et al. | 711/114 |
| 2004/0215990 A1 | 10/2004 | Allen et al. | |
| 2006/0069886 A1 * | 3/2006 | Tulyani | 711/161 |
| 2006/0143419 A1 * | 6/2006 | Tulyani | 711/165 |
| 2006/0187072 A1 | 8/2006 | Bruce et al. | |
| 2006/0248583 A1 | 11/2006 | Inoue et al. | |
| 2007/0025195 A1 * | 2/2007 | Oh et al. | 369/30.03 |
| 2007/0288102 A1 | 12/2007 | Korzin | |

* cited by examiner

*Primary Examiner*—Chun Cao
(74) *Attorney, Agent, or Firm*—Maxvalueip, LLC

(57) ABSTRACT

An example of the invention classifies disks drives based on their purpose and associating power-saving policies in multiple classes. The system implements Power On Demand, where a reduced power mode is enabled for every individual component of a storage subsystem. In addition, an embodiment of this invention extends a few power modes used in the prior art and allows almost infinite number of power modes when instructing a disk drive (via its I/O interface such as a SCSI or fiber channel interface) to enter a certain power saving mode. Furthermore, an embodiment of invention teaches a system and methods to save power in a disk system comprising a plurality of disk controllers and a plurality of disk drives, arranged in a plurality of arrays, where each array includes several (e.g., 4-16) disk drives.

1 Claim, 6 Drawing Sheets

STORAGE SYSTEM AND METHOD FOR SAVING ENERGY BASED ON STORAGE CLASSES WITH CORRESPONDING POWER SAVING POLICIES

BACKGROUND OF THE INVENTION

Unlike servers with power-down modes (e.g., sleep mode, hibernation mode) such energy-saving modes are not currently used for storage subsystems. The typical storage subsystem powers on all disk drives for all the time, even those drives which are practically never used. Spinning drives is quite costly in terms of energy consumption, hence lots of cooling is needed. There have been initiatives targeting data centers as well as individual machines for lowering power consumption, cooling effort, and carbon footprint, as the market for "green" initiatives in IT is growing with high customer interest.

In a disk system according to prior art such as IBM® DS8000®, IBM® DS6000® and IBM® DS4000® comprise a plurality of disk drives and disk controllers. Disk drives are arranged in arrays (such as RAID-5, RAID-10, RAID-6) to improve the availability. One array usually comprises 4-16 disks. The arrays in such disk systems have different purposes: some are used to store data, some are not yet configured for I/O and some are so called onDemand arrays which can be enabled by the customer using a feature code. According to these different purposes of arrays different power management policies can be defined and implemented.

Reducing the velocity versus stopping the disk balances the power saving and the access time. For example, a disk running at 60% of its nominal speed requires 7 seconds to become ready whereas a disk which is stopped requires 15 seconds. At the same time, a disk running at 60% of its nominal speed saves up to 51% power and a disk which is stopped saves 89% of it nominal power.

SUMMARY OF THE INVENTION

The invention implements Power On Demand, where a sort of sleep (i.e., reduced power) mode is enabled for every individual component of a storage subsystem, thereby minimizing overall consumption for the full subsystem and making it flexibly adapting to changing I/O loads. The invention provides a method to spin down the disk drives belonging to groups that are not used for a long time. For instance, RAID arrays without volumes don't need to have spinning drives at all the time, until volumes are actually created. Or, RAID ranks without license key (whose capacity can be increased on demand) do not have to be continuously under full power. Additional types of drives can be found which can selectively be powered down for a longer time without doing any harm to the performance of the storage subsystem. Although powering on represents some loss of time, if powering on is only needed after a long duration (maybe a month) when the first volume is created, this small performance lag may be acceptable given the enormous amount of energy saved in the mean time. Such systems are not currently available, and the current technologies on the market simply set power on for all the drives or fans.

This invention teaches a system and methods to save power in a disk system comprising a plurality of disk controllers and a plurality of disk drives, arranged in a plurality of arrays, where each array includes several (e.g., 4 - 16) disk drives. Thereby, the arrays are classified into different classes based on their usage. For each usage class, one or more power saving policies is established. These power saving policies are implemented by the disk system controllers.

In addition, this invention extends the prior art methods to instruct a disk drive via its I/O interface such as a SCSI or fibre channel interface to enter a certain power saving mode. While prior art describes only a few power modes (usually 4-8), one part of this invention teaches a method to allow almost infinite power modes. In one alternative, this is archived by using a SCSI Mode Select command and includes a parameter having a value Vp (e.g. between 1-100). This value Vp instructs the drive to reduce the disk velocity to a fraction of Vp: nominal-speed/Vp. In another embodiment, the invention makes use of and control prior-art disk drive low-power modes, such as a "Standby" mode (i.e., not spinning, servo and electronics power-down) or an "Unload" mode (i.e., servo circuit disabled). Then, the invention applies policy based on a way that certain groups or classes of drives are set to go to different power modes at different stages of their particular operational usage class.

When power can be saved with disk drives in a disk system then there are also potentials to save power consumed by power supplies. Because power supply controls the fan speed based upon the power consumption of the disk drives. If the disks save power then ultimately the power supplies can slow the fan down.

DETAILED DESCRIPTION OF THE PREFERRED EMBODIMENTS

In general, all components of the storage subsystem should use power management or a reduced-power mode. After hours of non-usage, an individual component should go into a lower-power mode. In particular for the disk drives, the invention teaches a method to automatically power down drives using an internal power-management within each drive and to identify certain groups of drives which will not be in use for long time, and to set these drives to even lower power levels.

An embodiment of invention powers off for all drives which are not part of fully formatted RAID arrays, or (as in DS8000®) belonging to arrays which are not part of an "Extent Pool", i.e. where no volumes can currently be created on. When a request comes to format an array, to bring it into an Extent Pool, or to create a volume on it: The time lag for this to power these drives on then will be acceptable. In particular, this turns off disk drives for all RAID ranks whose capacity can be increased on demand, i.e. ranks which are already physically installed in the machine, but where the license code to actually use them has not been applied yet.

An embodiment of invention turns off disk drives for all "spare" drives (or setting another sleep mode for the spare drives). RAID arrays sometimes include spare drives (e.g., RAID-5 with 6+P+S, or RAID-10 with 3+3+S+S). The spare drives may remain idle for months, and they may only come into action when another drive in the active RAID rank breaks. Until then, there is no need to keep this drive spinning for months. As sparing is a process taking in the range of an hour, a relatively additional very short time to power on such a spare drive on the breakage of another drive should be acceptable.

An embodiment of the invention powers down disk drives which are in formatted arrays and already part of an Extent Pool, so they can carry volumes soon (but they don't actually contain any volumes yet). The customers often reserve some RAID ranks for later use; however, these may not be used for months, and such ranks don't need to be under full power all the time.

Problems may occur when not using drives for long duration, i.e. when powering them on after months, these drives might just fail. To overcome this issue, a periodic power-on/spinning could be performed along with checking the viability of the drives.

At each part of the machine where fans are used, including the power supplies, an embodiment of the invention measures temperature inside the box and reduces fan speed if the temperature is low enough, to save energy. It increases the fan speed if additional load or heat demands.

Figure 1:
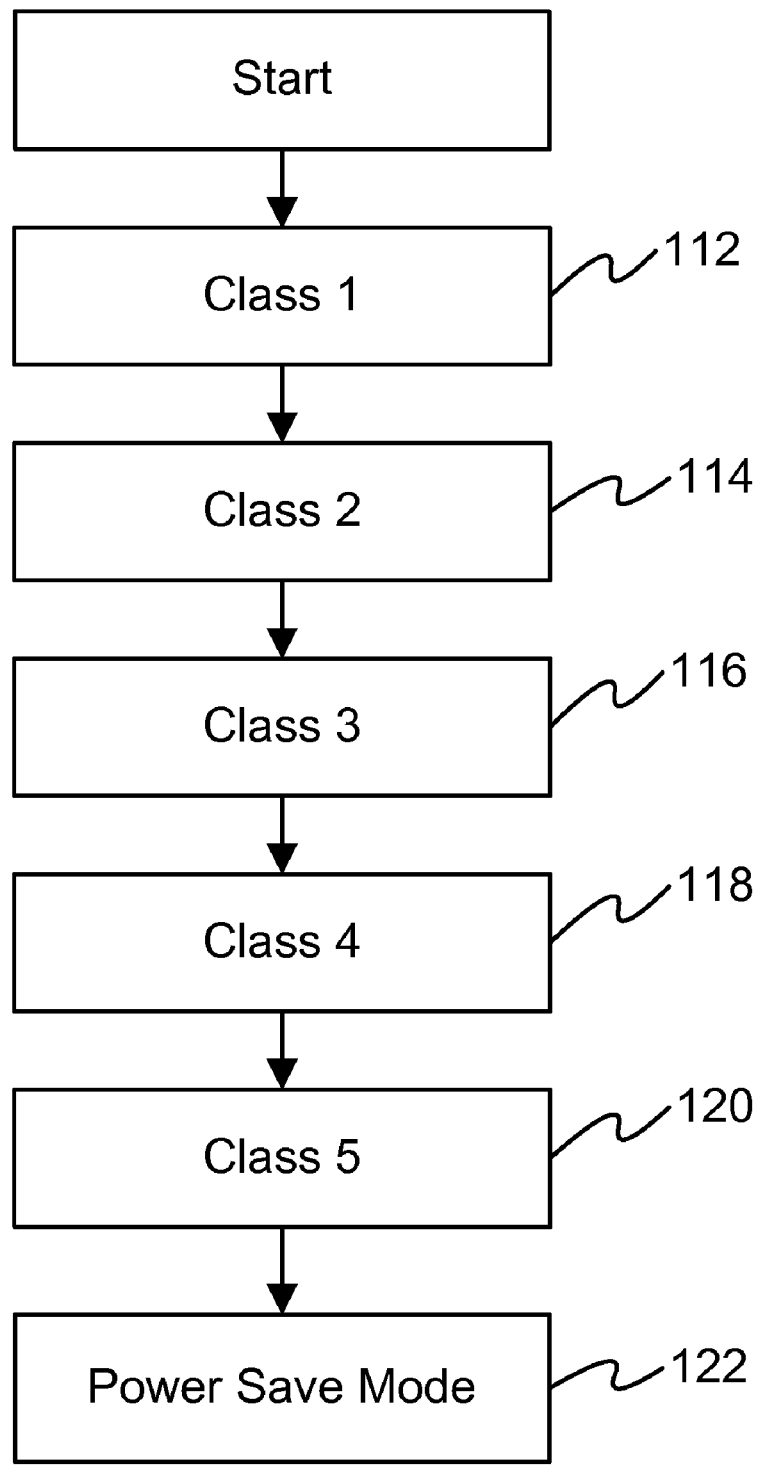
FIG. 1 is a flow diagram of the power savings system.
Figure 2:
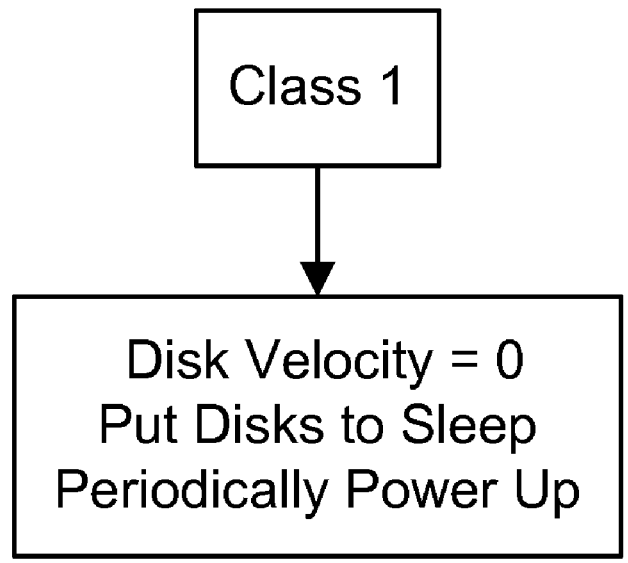
FIGS. 2-6 are detailed diagrams of individual classes.

An implementation details for an embodiment of the invention is depicted in FIG. 1 showing a flow diagram for power saving system having Class 1 (112), Class 2 (114), Class 3 (116), Class 4 (118), Class 5 (120), and power save mode (122) defined for disk arrays according to their purpose:

Class 1: Disk arrays which are not used and which are not configured yet (FIG. 2)

Figure 4:
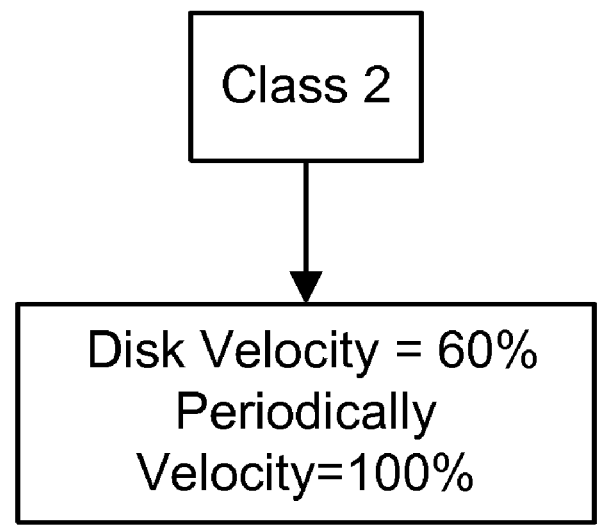

Class 2: Disk arrays which are configured for On-Demand purposes, or other disk arrays containing no volumes (FIG. 4)

Figure 6:
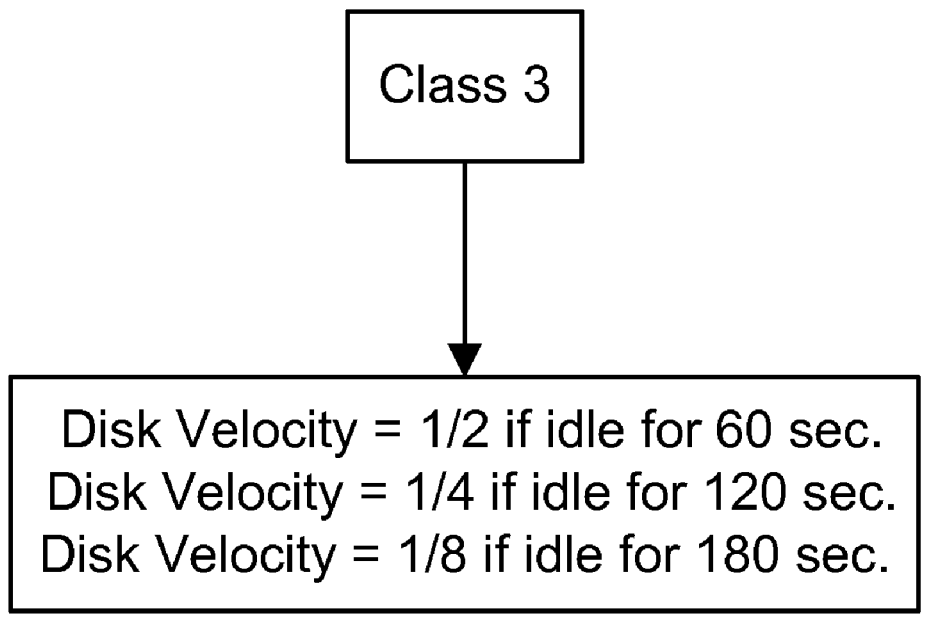

Class 3: Disk arrays which are used for data, "online"/production storage (FIG. 6)

Figure 3:
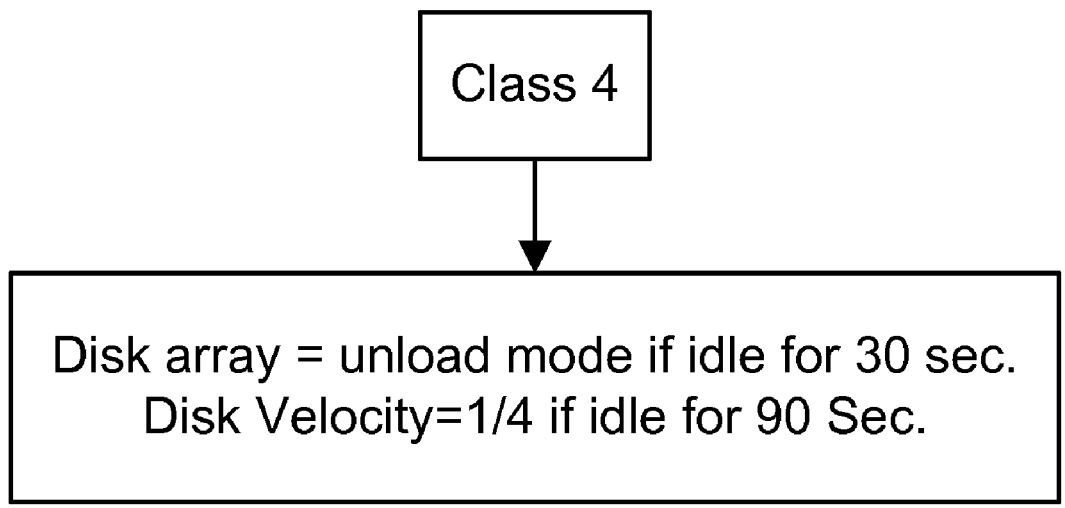

Class 4: Disk arrays used for data, "near-line" storage (FIG. 3)

Figure 5:
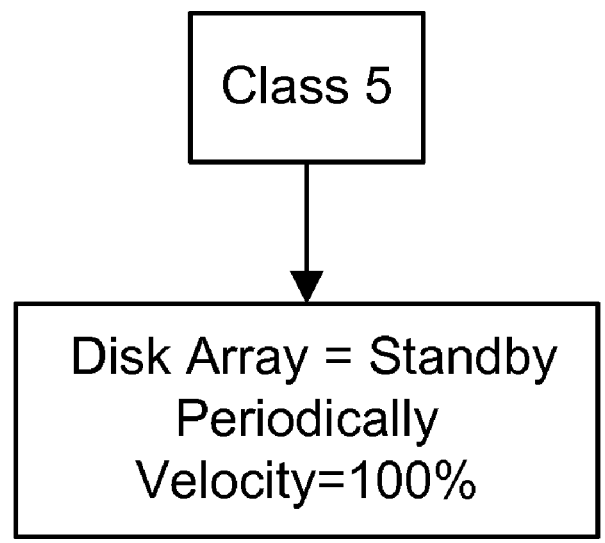

Class 5: Spare drives (FIG. 5)

A disk subsystem typically allows the user to configure the purpose of disk arrays. Thereby, the disk controller can derive these classes. From a mix of different disk drive types (e.g. FC and SATA) the storage controller can also assume different classes, or it can automatically identify the spare drives. Disk arrays without volumes can be identified automatically by the controller, as well as disk arrays where there is no licence key applied yet to use them.

Based on the usage-classes for disk arrays comprised in a disk system, the following power-saving-policies can be applied. In this example, we describe the power saving policies based on spindle velocity reduction (however in alternate embodiments, other disk drive power saving modes can be implemented using existing disk drive low-power modes):

Class 1 (Not Used Disk Arrays—FIG. 2)
  Reduce disk velocity to 0.
  Put the disks into a Sleep (Standby) mode.
  Periodically power on all disks pertaining to the array and run diagnostic and scrubbing. Periodic power on is based on an interval given by the user and the utilization of the associated disk controller.
  Rational: un-used disks do not have to spin. They must be ready to be used after 1-2 minutes, triggered by the user wanting to use these disks.

Class 2 (Disk Arrays or Other Disk Arrays Containing No Volumes Yet, But Whose Capacity Can be Increased on Demand—FIG. 4)
  Reduce disk velocity to 60% of the full speed.
  Periodically bring disks to full speed disks pertaining to the array and run diagnostic and scrubbing. Periodic bring-up is based on an interval given by the user and the utilization of the associated disk controller.
  Rational: Such disks do not have to spin at full speed. However they must be ready 20-30 seconds after the user request (e.g. demand for capacity). Therefore, they cannot be powered off completely since the time to get ready will be too long.

Class 3 (Used Disk Array, "Online" Storage—FIG. 6)
  Reduce disk velocity to ½ if disks are idle for 60 seconds.
  Reduce disk velocity to ¼ if disks are idle for additional 60 seconds.
  Reduce disk velocity to ⅛ if disks are idle for additional 60 seconds.
  The lowest revolution possible for this class can be configured by the user.
  Rational: Disks which are used must be readily available. Therefore the revolution is decreased step by step when the disk array is idle. These disks cannot be powered off. The lowest revolution can be configured by the user. Thereby the user may specify the time to become ready which is then translated into a minimum revolution speed. "Online" storage means disks meant for ongoing production with full-time duty cycle. Typically FC, SAS, or SCSI disk drives are used for this.

Class 4 (Used Disk Array, "Near-Line" Storage—FIG. 3)
  Set disk array to "Unload" mode if disks are idle for 30 seconds
  Reduce disk velocity to ¼ if disks are idle for additional 60 seconds.
  The lowest revolution possible for this class can be configured by the user.
  Rational: "Near-line" means storage that is not meant for ongoing access. It is accessed rather seldom, therefore can go earlier to lower-power levels than "online" storage, and it can go to even deeper power levels, as slightly higher startup times are acceptable. Typically, SATA drives are used for this.

Class 5 (Spare Drives—FIG. 5)
  Bring Spare Drives of RAID arrays into a Standby (or Sleep) energy mode, i.e. with almost no power used for them.
  Periodically raise the spare drives into a higher power-mode, to start data scrubbing and ensure the viability of the drive.
  Rational: Spare drives are not used for months. During that time, there is no need to keep them in higher power modes. There is no need for immediate readiness of a drive when the sparing process starts—for pending I/Os, can still read from the rest of the RAID, and the startup time from Standby mode will still be very small compared to the duration of the sparing process.

Implementation of Policies and Classes

The controllers of a disk system automatically recognize the class of a disk array based on the configuration the user enters or detects them based on their current physical usage (e.g. for spare drives, empty arrays, arrays without licence key, nearline drive types) and they implement the corresponding power saving policy. The controller uses SCSI mode Select commands to instruct all disk drives pertaining to one array to reduce the velocity of the disks. For example, the controller may send all disks of a class 2 the SCSI Mode Select command including parameter Vp where Vp=10. This instructs all disks drives to reduce the drive speed to the fraction of 1/10 of its nominal speed.

In one embodiment, the user can alter the power saving policies for each class. For classes 1 and 5, the user can configure the power-on interval (e.g. daily, weekly or monthly). For class 2, the user can configure the power saving factor expressed by Vp and the power-on interval (e.g. daily, weekly or monthly). For classes 3 and 4, the user can configure the idle times and the power saving factors expressed by Vp for each step.

If the usage of a disk array is changed—e.g., a disk array with no volume (whose capacity can be increased on demand) (class 2) is now being used for data (classes 3 or 4)—it automatically inherits the power management policy of the new class.

An embodiment of the invention is a method for saving energy in a storage system that comprises disk arrays or storage units. The method comprising:

classifying a first member of the disk arrays or storage units into a first one of storage classes, based on a usage of the first member;

assigning a first power-saving policy to the first member, based on the first one of the storage classes;

assigning a second power-saving policy to a second member of the disk arrays or storage units; wherein the second power-saving policy is different from the first power-saving policy;

based on the first power-saving policy, applying a multiple-reduced-disk-speeds policy, a full-speed-disk policy, a sleep-mode policy, a standby policy, a periodically-power-on policy, a power-on interval policy, a recovery policy, a redundancy policy, an availability policy, a diagnostic policy, a scrubbing policy, a user-controlled parameters policy, a utilization policy, an un-used disk policy, an on-demand policy, a delay-to-spin policy, an idle-mode policy, a minimum-revolution speed policy, a duty-cycle policy, a low-power mode policy, an on-line storage policy, a near-line storage policy, a spare-drive storage policy, an unload-mode policy, a fully-formatted array policy, a partially-formatted array policy, a fan-speed policy, a temperature policy, a conservation policy, a power-down policy, a percentage-activity policy, and a backup policy, to the first member;

self-optimizing capabilities for the first member, by learning and adapting to usage patterns for the first member; and automatically, in coordination with other members of the disk arrays or storage units, switching the first one of the storage classes, to another one of the storage classes, based on the usage patterns for the first member.

An embodiment of the invention also applies a solid state disk policy (e.g., for flash drives) as these solid state type drives tend to have different energy-related characteristics and behavior.

A system, apparatus, or device comprising one of the following items is an example of the invention: drives, disk drives, optical drive, SCSI, solid state devices, storage, RAID, connector, optical communication, server, client device, PDA, mobile device, cell phone, router, switches, network, communication media, cables, fiber optics, physical layer, buffer, nodes, packet switches, computer monitor, or any display device, applying the method mentioned above, for the purpose of energy conservation, disk drive technology, or storage technology and management.

Any variations of the above teaching are also intended to be covered by this patent application.

The invention claimed is:

1. A method for saving energy in a storage system, said storage system comprising disk arrays or storage units, said method comprising:

classifying a first member of said disk arrays or storage units into a first one of storage classes, based on a usage of said first member;

assigning a first power-saving policy to said first member, based on said first one of said storage classes;

assigning a second power-saving policy to a second member of said disk arrays or storage units;

wherein said second power-saving policy is different from said first power-saving policy;

based on said first power-saving policy, applying a multiple-reduced-disk-speeds policy, a full-speed-disk policy, a sleep-mode policy, a standby policy, a periodically-power-on policy, a power-on interval policy, a recovery policy, a redundancy policy, an availability policy, a diagnostic policy, a scrubbing policy, a user-controlled parameters policy, a utilization policy, an un-used disk policy, an on-demand policy, a delay-to-spin policy, an idle-mode policy, a minimum-revolution speed policy, a duty-cycle policy, a low-power mode policy, an on-line storage policy, a near-line storage policy, a spare-drive storage policy, an unload-mode policy, a fully-formatted array policy, a partially-formatted array policy, a fan-speed policy, a temperature policy, a conservation policy, a power-down policy, a percentage-activity policy, and a backup policy, to said first member;

self-optimizing capabilities for said first member, by learning and adapting to usage patterns for said first member; and automatically, in coordination with other members of said disk arrays or storage units, switching said first one of said storage classes, to another one of said storage classes, based on said usage patterns for said first member.

* * * * *